Figure 2:
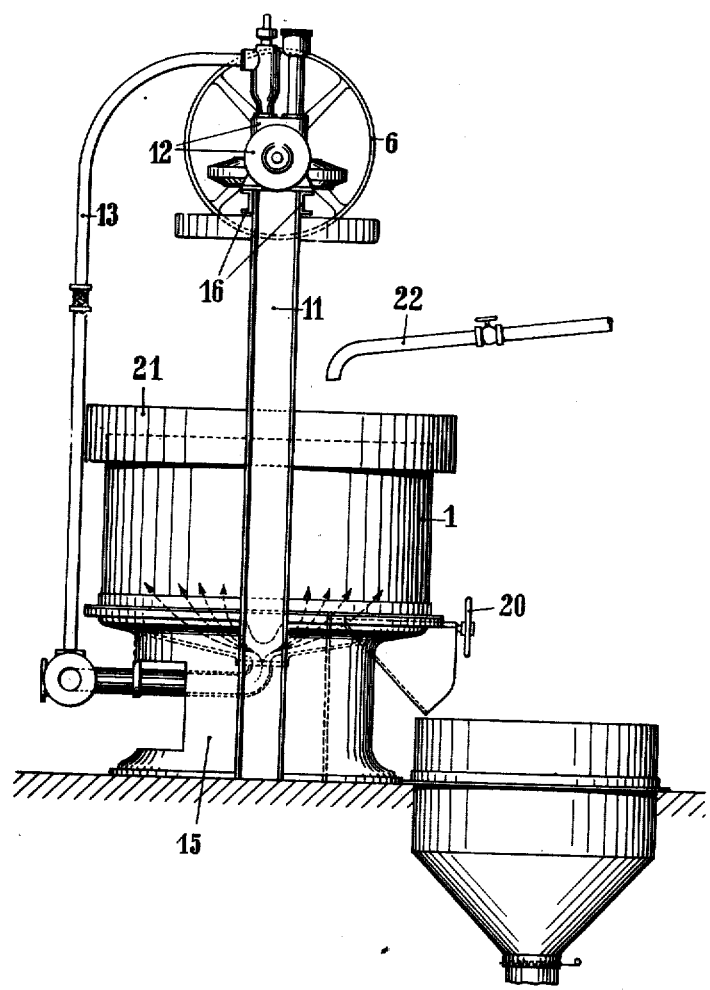

Sept. 2, 1924. 1,506,830
P. GROSS
APPARATUS FOR MAKING FOOD PRODUCTS FROM GRAIN
Filed Aug. 3, 1922 2 Sheets-Sheet 1
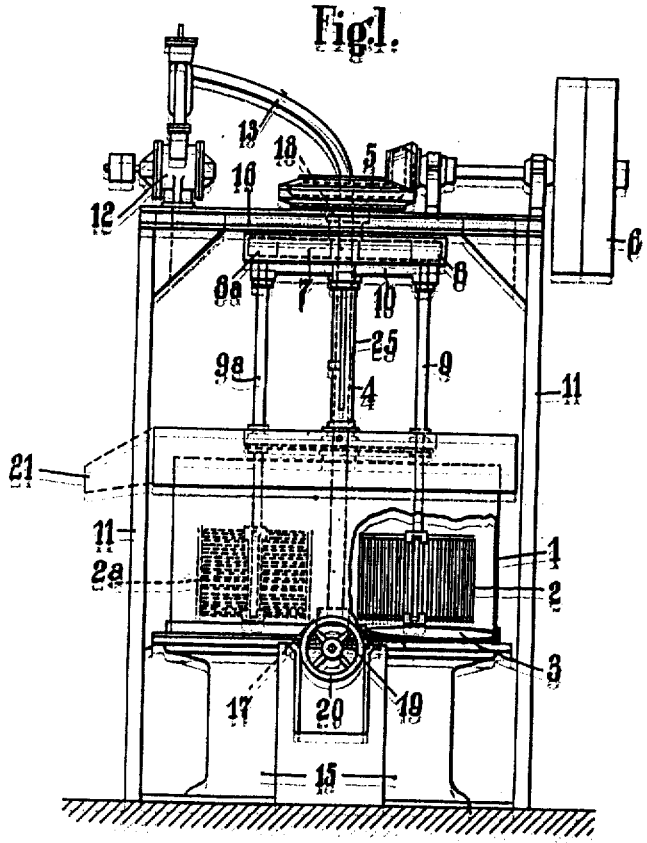
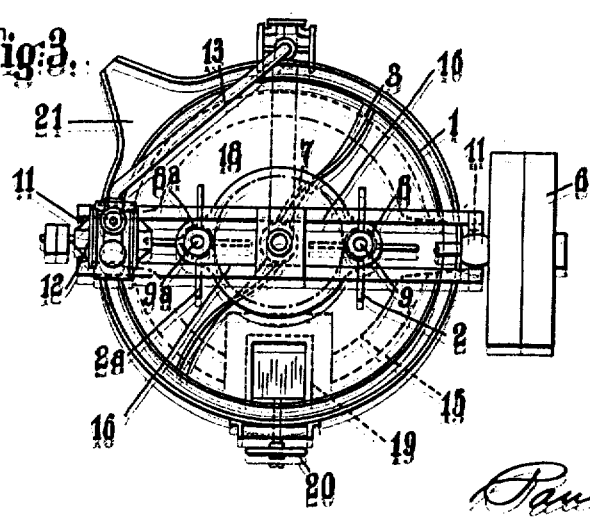
Inventor
Paul Gross.

Sept. 2, 1924.

P. GROSS 1,506,830

APPARATUS FOR MAKING FOOD PRODUCTS FROM GRAIN

Filed Aug. 3, 1922 2 Sheets-Sheet 2

Inventor:
Paul Gross.
By - Prentiss, Stone & Boyden
Attorneys.

Patented Sept. 2, 1924.

1,506,830

UNITED STATES PATENT OFFICE.

PAUL GROSS, OF BERLIN, GERMANY, ASSIGNOR OF ONE-FIFTH TO PEASLEE, BRIGHAM AND GENNERT, OF NEW YORK, N. Y.

APPARATUS FOR MAKING FOOD PRODUCTS FROM GRAIN.

Application filed August 3, 1922. Serial No. 579,525.

*To all whom it may concern:*

Be it known that I, PAUL GROSS, a citizen of Germany, and resident of Berlin, in the State of Prussia, German Empire, have invented certain new and useful Improvements in Apparatus for Making Food Products from Grain, of which the following is a specification.

My invention relates to improvements in apparatus for making food products from grain, and more particularly in apparatus for separating from the grain the husks by first thoroughly washing the grain by means of water while stirring the same within a suitable vessel, thereafter soaking the grain with water at elevated temperature, preferably at a temperature of 60 to 65° C., while stirring and beating the same for gradually separating therefrom the husks, removing the separated husks from the mass of grain, disintegrating the grain separated from the husks, and working the grain into food products.

I have found that by thus treating the grain I am enabled to remove therefrom the undigestible matter and more particularly the husks mainly consisting of cellulose, while the digestible parts and more particularly those containing the carbohydrates (starch) and the albumen (gluten) enter almost without loss into the food product. The dough thus obtained can be cooked into bread or into food preserves and more particularly food products which are in a dry state and which therefore can be stored for any length of time without losing their good taste and digestibility. Dry food preserves thus made from the mass obtained by the aforesaid process are particularly suitable for use in hospitals, for tourists' use and the like, by reason of their high nourishing property.

One of the objects of the improvements is to provide an apparatus for carrying out the aforesaid process, by means of which the husks are speedily separated from the grain, and which requires comparatively little power. With this object in view my invention consists in providing a plurality of beating members within a vessel or trough, which members are mounted for having planetary movement and which therefore revolve about a common axis and in addition perform rotary movement each about its own axis. Thereby I am enabled to construct each beating member with comparatively small diameter, so that it requires a minimum of power. Notwithstanding this substantially the whole area of the trough is subject to the beating action of the beating members. The revolving movement is peculiar in that the consistency and amount of material treated affects the speed of the movement.

Another object of the improvements is to provide novel driving means for the beating and stirring members, the object being to provide driving means which are simple in construction. With this object in view my invention consists in mounting the beating and stirring members vertically and parallel to each other, so that they are passed into the vessel or trough from above. Other objects of the improvements will be understood from the following description.

In order that my invention be more clearly understood an example embodying the same has been shown in the accompanying drawings, in which the same reference characters have been used in all the views to indicate corresponding parts. In said drawings, Fig. 1, is an elevation of the apparatus partly in section, Fig. 2, is an elevation seen from the left in Fig. 1 and Fig. 3, is a plan view thereof.

As shown my improved apparatus consists of a vessel or trough 1 mounted on pillars 15 and a frame consisting of uprights 11 and transverse beams 16. Centrally of the trough a vertical shaft 4 is mounted in bearings 17 and 18 disposed one at the bottom of the trough and the other one on the transverse beams 16 and adapted to be rotated from a belt pulley 6 through the intermediary of bevel gear wheels 5. To the bottom end of the shaft 4 and to be rotated therewith and thereby, a stirring member 3 is keyed which sweeps on the bottom of the trough and close to the circumference thereof, and which, by reason of the helical form of its blades has the function to throw the grains from the bottom of the trough upwardly into the path of the beating members 2 and 2ª. On the shaft 4 and rotatably mounted independently thereof is a frame which consists of a tubular member 25 and upper and lower transverse members 10 providing guides for shafts 9 and 9ª extending downward into the trough and carrying at their lower ends beating members 2 and 2ª. As shown only two beating members are provided. But I wish it to be understood that I do not limit myself to this number of beating members. To the top ends of the shafts 9 and 9ª pinions 8 and 8ª are keyed which are in mesh with a large gear wheel 7 keyed to the shaft 4.

Preferably the beating members comprise each four wings or blades in a form similar to grates, and the bars of consecutive grates are staggered with relation to each other by being disposed at an angle to each other, the bars of one grate being vertical and the next one horizontal. The paths of movement of the grate bars thus intersect, and give a maximum efficiency in the stirring movement.

On the beams 16ª blower 12 is mounted which communicates through a pipe 13 with the bottom part of the trough 1 for forcing air under pressure through the same to remove the husk from the mass and collect it at the top thereof.

Claims directed to the process for the removal of the husks from the mass by the introduction of air under pressure from the bottom toward the top are presented in my copending divisional application Serial No. 688,538, filed January 25, 1924.

The trough is formed with a bottom discharge 19 the slide valve of which is controlled by a hand wheel 20, and with a discharge 21 at its top for the water used for washing the grain, and any excess of water used for soaking the same together with the husks, which water may be further treated for regenerating the starch contained therein, as is known in the art. Through the bottom discharge the grain treated within the trough is supplied to further apparatus for treating the unhusked grain. 22 is a supply for cold or hot water required for washing and soaking the grain.

The operation of the apparatus is as follows:

The trough 1 is first charged with the grain to be treated, and cold water is supplied through the pipe 22 for washing. Now the shaft 4 is rotated for operating the stirring member 3. The rotary movement is transmitted through the gear 7 and the planet gears 8 and 8ª to the shafts 9 and 9ª and the beating members 2 and 2ª which are thereby set into rotation. However, by reason of the resistance to the rotation of the beating members within the mass of water and grain the system of beating members and the supporting frame 25 and 10 are set in motion around the shaft 4 under the driving action of the gear 7, so that the beaters 2 and 2ª are gradually moved through the whole trough 1. The grain gets in thorough contact with the bars of the beaters, so that any impurities adhering thereto are removed, while the husks are not yet separated. The impurities are removed from the trough through the top discharge by continuously supplying fresh water through the pipe 22. After thus cleaning the grain warm water at a temperature of 60 to 65° C. is supplied, and the velocity of the system is increased. Thus the husks are softened and separated by the beaters, and in addition the breaking of the albumen bearing skin of the grain is started by the action of the beaters. Thereafter the system is stopped and air under pressure is forced into the trough, so that the separated husks rise to the surface of the mass, from which they are discharged by a fresh supply of water through the top discharge 21. Finally the grain is removed and passes through crushing rollers, as is known in the art. Thereafter the matter is directly worked into dough for making bread, or it is dried and otherwise treated for making therefrom dry food preserves, such as flakes or flour, which can be stored for any length of time, and which by reason of their high nutritious property and digestibility are suitable for various purposes.

From the foregoing description of the invention it will be understood that within a trough of high capacity beaters of small diameters are provided which require a minimum of power. The beaters are moved through the whole trough, so that thorough action on the whole mass of grain is insured. By providing a plurality of beaters the water and grain are set into violent motion, which likewise insures thorough action. Accordingly, experience has shown that the time required for washing and unhusking the grain is materially reduced as compared to the methods now in use using a single beater.

The driving mechanism is simple in construction, the same belt gearing and bevel gears 5 being used for operating both the stirring member 3 and all the beating members 2 and 2ª. The said members are readily accessible from above for cleaning the same. By mounting the members on vertical shafts and providing beating members having apart from their rotary movement a progressive movement, a trough of great capacity can be provided.

While in describing the invention reference has been made to a particular example embodying the same, I wish it to be understood that my invention is not limited to the construction shown in the drawings, and that various changes may be made in the general arrangement of the apparatus and the construction of its parts within the scope of my invention.

I claim:

1. In an apparatus of the class described, the combination, with a trough adapted to receive the grain, of a rotary beater within said trough comprising a plurality of beating members each separately rotatable and spaced from the axis of the beater and each composed of beating bars, the bars of successive members being disposed at different angles with respect to each other and relatively to the axis of the rotary beater and having paths of movement which intersect.

2. In an apparatus of the class described, the combination, with a trough adapted to receive the grain, of a rotary beater within said trough comprising a plurality of beating members, each separately rotatable and spaced with their axes about the axis of the rotary gear and each composed of beating bars, the bars of successive members being respectively perpendicular and parallel to the axis of the rotary beater and having paths of movement which intersect.

3. In an apparatus of the class described, the combination, with a trough adapted to receive the grain, of a movable driving member and its operating mechanism, a rotary beater within said trough and bodily movable relatively to said driving member and free to revolve about the axis of said driving member, and a driven member connected with said beater and driving member and adapted to have a rotary movement on its own axis and a progressive movement.

4. In an apparatus of the class described, the combination, with a trough adapted to receive the grain, of a rotary driving member and its operating mechanism, a rotary beater within said trough and mounted for revolving freely relatively to said driving member, and a driven member connected with said beater and with said driving member and adapted to have a rotary movement on its own axis and revolving movement relative to said driving member.

5. In an apparatus of the class described, the combination, with a trough adapted to receive the grain, of a rotary driving gear wheel and its operating mechanism, a rotary beater within said trough and mounted for revolving freely relatively to said driving gear wheel, and a driven gear wheel connected with said beater and in engagement with said driving gear wheel.

6. In an apparatus of the class described, the combination, with a trough adapted to receive the grain, of a beating member having a vertical axis extending into said trough from above and having rotary movement about its vertical axis and progressive movement relatively to the trough, and a blower mounted above said trough and communicating with orifices made in the bottom of the trough and adapted to force air upwardly from the bottom through the contents of the trough.

7. An apparatus of the character described, the combination of a vessel adapted to receive material to be treated, a rotary driving gear wheel mounted with its axis vertical, a beater member mounted to rotate on its own axis and to travel around the axis of said gear wheel, a driven gear connected to said beater member to rotate therewith and in mesh with said driving gear to be rotated thereby, and a rotatable supporting bearing in which said beater and said driven gear are rotatably journaled, said bearing being mounted with its axis in alignment with the axis of said gear wheel and freely rotatable with respect thereto.

8. An apparatus of the character described, the combination of a vessel adapted to receive material to be treated, a rotary driving gear wheel mounted with its axis vertical, a beater member mounted to rotate on its own axis and to travel around the axis of said gear wheel, a driven gear connected to said beater member to rotate therewith and in mesh with said driving gear to be rotated thereby, a rotatable supporting bearing in which said beater and said driven gear are rotatably journaled, said bearing being mounted with its axis in alignment with the axis of said gear wheel and freely rotatable with respect thereto, and means comprising the material to be treated within said vessel to resistingly and yieldably permit said beater to rotate and cause the rotary movement of the driven gear to be at least in part translated to a traveling movement around said driving gear.

9. In apparatus of the character described, the combination of a trough adapted to receive grain, a driving member, a driven vertical shaft in said trough, a rotary stirring member secured to said vertical shaft to be rotated thereby and having arms extending above the floor of the trough toward the side walls thereof, and a rotary beater above said stirring member, said beater being journaled to revolve on and about the axis of said driven shaft and freely with respect thereto.

10. In apparatus of the character described, the combination of a trough adapted to receive grain, a driving member, a driven vertical shaft in said trough, a rotary stirring member secured to said vertical shaft to be rotated thereby and having arms extending above the floor of the trough toward the side walls thereof, a rotary beater above said stirring member, said beater being journaled to revolve on and about the axis of said driven shaft and freely with respect thereto and having a rotary movement on its own axis offset from the axis of said driven shaft.

Signed at Berlin in the State of Prussia, German Empire, this 30th day of June, A. D. 1922.

PAUL GROSS.

Witness:
J. HOLZERMER.